(12) United States Patent
Busse et al.

(10) Patent No.: US 7,974,896 B2
(45) Date of Patent: Jul. 5, 2011

(54) METHODS, SYSTEMS, AND COMPUTER PROGRAM PRODUCTS FOR FINANCIAL ANALYSIS AND DATA GATHERING

(75) Inventors: Daniela K. Busse, San Francisco, CA (US); Barbara Wittmann, Hettenshausen (DE); Eckhard Farrenkopf, Schriesheim (DE)

(73) Assignee: SAP AG, Walldorf (DE)

( * ) Notice: Subject to any disclaimer, the term of this patent is extended or adjusted under 35 U.S.C. 154(b) by 914 days.

(21) Appl. No.: 11/486,118

(22) Filed: Jul. 14, 2006

(65) Prior Publication Data

US 2008/0015919 A1     Jan. 17, 2008

(51) Int. Cl.
*G06Q 40/00*     (2006.01)

(52) U.S. Cl. ......................................................... 705/35

(58) Field of Classification Search ...................... 705/35
See application file for complete search history.

(56) References Cited

U.S. PATENT DOCUMENTS

| | | | |
|---|---|---|---|
| 5,406,477 A * | 4/1995 | Harhen .............................. | 703/6 |
| 6,408,259 B1 * | 6/2002 | Goebel et al. ................... | 702/183 |
| 2004/0186762 A1 * | 9/2004 | Beaven et al. ...................... | 705/8 |
| 2005/0144022 A1 * | 6/2005 | Evans ................................ | 705/1 |
| 2005/0154628 A1 * | 7/2005 | Eckart et al. ..................... | 705/10 |
| 2006/0143231 A1 * | 6/2006 | Boccasam et al. .......... | 707/104.1 |
| 2007/0150387 A1 * | 6/2007 | Seubert et al. ................... | 705/31 |
| 2007/0198322 A1 * | 8/2007 | Bourne et al. ................... | 705/10 |

OTHER PUBLICATIONS

Westcott, Tom R. "Sifting Through Project Data: The Most Important Data Elements of Project Management". DM Review. Jun. 1, 2006.(3 pages).*

"Promatis Tailors Enterprise Software Collections for Biotech and Defence Industries-Bundle Offers Means to Meet Documentation Regulations and Procedures Based on ISO and GMP Guidelines." Business Wire, Dec. 12, 2001. (3 pages).*

Mestchian, Peyman, Gary Cokins. "Risk Based Performance Management-Making It Work". Business Credit; May 2006; 108, 5, p. 28 (3 pages).*

"Witness Systems Releases Enhanced Workforce Management Solution." Business Wire. May 11, 2005. (3 pages).*

Johnson, Mark. "Steps Toward An Automated Scorecard System", Healthcare Financial Management.; Feb. 2006; 60, 2; p. 84 (6 pages).*

* cited by examiner

*Primary Examiner* — Elda Milef
(74) *Attorney, Agent, or Firm* — Finnegan, Henderson, Farabow, Garrett & Dunner LLP

(57) ABSTRACT

Systems, methods and computer readable media are provided for controlling operations of an enterprise. In one exemplary embodiment, a method is provided that includes creating an alert model that may be parameterized by a user to monitor the behavior of one or more operational drivers. The method may also include monitoring the behavior of the one or more operational drivers based on the alert model and sending an alert message when the behavior of the one or more operational driver causes a deviation from a preset standard. The method may further include analyzing the alert message to determine one or more behaviors contributing to the alert and communicating the alert message to others in order to collaborate on correcting the deviation from the preset standard. Moreover, the method may include generating a report summary regarding the alert.

14 Claims, 9 Drawing Sheets

METHODS, SYSTEMS, AND COMPUTER PROGRAM PRODUCTS FOR FINANCIAL ANALYSIS AND DATA GATHERING

TECHNICAL FIELD

The present invention generally relates to the fields of data processing and analysis. More specifically, the invention relates to methods, systems, and computer program products for identifying emerging variances between projected results and plan results, and providing tools to support the steering of an operation towards the plan results.

BACKGROUND INFORMATION

An enterprise typically utilizes a controller to manage the financial affairs of the enterprise. Duties of the controller may comprise monitoring data, such as employee timecards, account receivables (A/R), inventory levels, sales order, production reports, and the like. A controller may use this data to generate forecasts or trends, create reports for budget or production analysis, and/or general strategy analysis.

Currently, the controlling process at an enterprise is done either manually or is semi-automated. For example, in a monthly controlling process, the controller may collect actual data for the purpose of comparison to plan data. Actual data refers to data that has been recorded and based upon an already executed transactions. For example, actual data may include monthly sales data or production data that have been recorded for an already completed month. Plan data refers to preset goals, forecasts or targets, such as the amount of sales or level of production that should be achieved for a particular period of time. Actual data may be gathered from diverse sources, such as spreadsheets created by individual departments (e.g., sales and production), e-mails, collaborative meetings, handwritten notes, and so forth. Specific examples of data collected include open sales orders, revenue information, order cancellations, inventory levels, pipeline information, trend information, and last minute information/updates. The actual data may then be consolidated in order that it may be analyzed by the controller for any deviations from the plan data.

To correct a deviation between the actual data and the plan data, the root cause of the deviation must be understood. However, this process may be very difficult and time consuming. For instance, because the data was consolidated, there is often no link to the transactional or even reporting details contributing to the result. Therefore, additional meetings and communications between representatives from the various departments in an enterprise are needed to determine the root cause of the deviation. When the root cause of the deviation is discovered it may be added to the report for later review at, for example, a sales and operations meeting.

The sales and operations meeting, which may occur once a month, allows the responsible department representatives and the controller to discuss deviations from the plan data and possible corrective actions. In most cases, there is no immediate decisions made during the sales and operations meeting. Instead, options are discussed and tasks are distributed for clarification and subsequent reporting to the controller who makes the final call on corrective actions. This final call is based on all the feedback information that the controller collects. After the corrective action is chosen, the controller may further designate follow-up tasks.

As a result of the large amount of data and constant communications that are necessary for a controller to perform his or her job, a controller may not have enough time to perform their job effectively. In particular, the most time consuming exercises performed by a controller are data consolidation and data gathering, analysis of data, system maintenance, collaboration, and providing management summaries.

Further, current controlling processes are incapable of understanding the analytical models of operational drivers (e.g., occurring sales transactions) and their impact on overall revenue. For example, the current controlling processes lack the ability to utilize projected data to project a loss of revenue compared to plan revenue for a predetermined time period. Projected data refers to data that is arrived at by extrapolating actual data and historical performances to generate a trend of where the actual data will be at a specified instance in future time. With these current processes, the controller can only be alerted of this loss at the end of the period when all the actual data necessary to show the loss is available.

Accordingly, there is a need for a solution that utilizes an enterprise application capable of automating and centralizing the financial operation steering process through interaction with, for example, an enterprise resource planning (ERP) system. Such a solution should enable a controller to take a proactive approach to emerging variances. In particular, a solution is needed to support a controller to gather data, identify deviations, resolve deviations, and perform follow-ups. Further, it would be beneficial to provide an alert mechanism to alert the controller of a resulting deviation. The alert mechanism may be based on analytics that are conceptualized in a projection plan and presented relative to the actual plan.

SUMMARY

In accordance with the principles of the present invention, as embodied and broadly described herein, methods, systems and computer program products are provided for identifying emerging variances between projected results and plan results, and providing tools to support the steering of an operation towards the plan results.

Such solutions, as described above, may be embodied in an enterprise application, referred to herein as a financial operations steering system (FOSS). FOSS may enable the monitoring of data to identify emerging variances between projected data and plan data, and provide functions to steer the operation back towards the plan data.

According to one embodiment, a method is provided for controlling operations of an enterprise. The method may comprise creating an alert model that may be parameterized by a user to monitor the behavior of one or more operational drivers, monitoring the behavior of the one or more operational drivers based on the alert model, sending an alert message when the behavior of the one or more operational drivers causes a deviation from a preset standard, analyzing the alert message to determine one or more behaviors contributing to the alert, communicating the alert message to others in order to collaborate on correcting the deviation from the preset standard, and generating a report summary regarding the alert.

According to another embodiment, a computer-readable medium including program instructions for performing, when executed by a processor, a method for controlling operations of an enterprise. The method may comprise creating an alert model that may be parameterized by a user to monitor the behavior of one or more operational drivers, monitoring the behavior of the one or more operational drivers based on the alert model, sending an alert message when the behavior of the one or more operational drivers causes a deviation from a preset standard, analyzing the alert message to determine one or more behaviors contributing to the alert, communicating the alert message to others in order to collaborate on correcting the deviation from the preset standard, and generating a report summary regarding the alert.

According to another embodiment, a system is provided for controlling operations of an enterprise. The system may comprise a data warehouse that stores enterprise-wide data, including operational drivers, that pertain to the operations of the enterprise, and a financial operations steering system that utilizes alert models to monitor the data stored within the data warehouse to identify emerging variances between projected data and plan data of an operation, and provides functions to steer the operation back towards the plan data.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

As disclosed herein, FOSS represents a user-centric method and system for the performance of a financial operation steering process. That is, FOSS is capable of performing the entire end-to-end process for operational dynamic steering within a financial controller's environment, which includes alert modeling, detection, collaborative resolution and follow-up, as well as additional reporting on alerts. FOSS accomplishes this by utilizing some of the existing functionality present in an enterprise's information technology infrastructure. In particular, FOSS utilizes some of the functionality present in an Enterprise Resource Planning (ERP) system of an enterprise, as well as the integration and application platform that the ERP system is built upon.

In general, ERP systems are integrated information systems that help enterprises better control their assets and business processes by creating adaptive systems that improve internal and external operations and enhance collaboration with constituents, customers, and suppliers. One example of an ERP system is the mySAP™ ERP solution provided by SAP AG of Walldorf, Germany. An ERP system may comprise individual modules or software applications that provide support of enterprise key areas, such as financial management, human capital management, product development and manufacturing, and sales and service. One example of an integration and application platform is NetWeaver, also developed by SAP AG.

Figure 1:
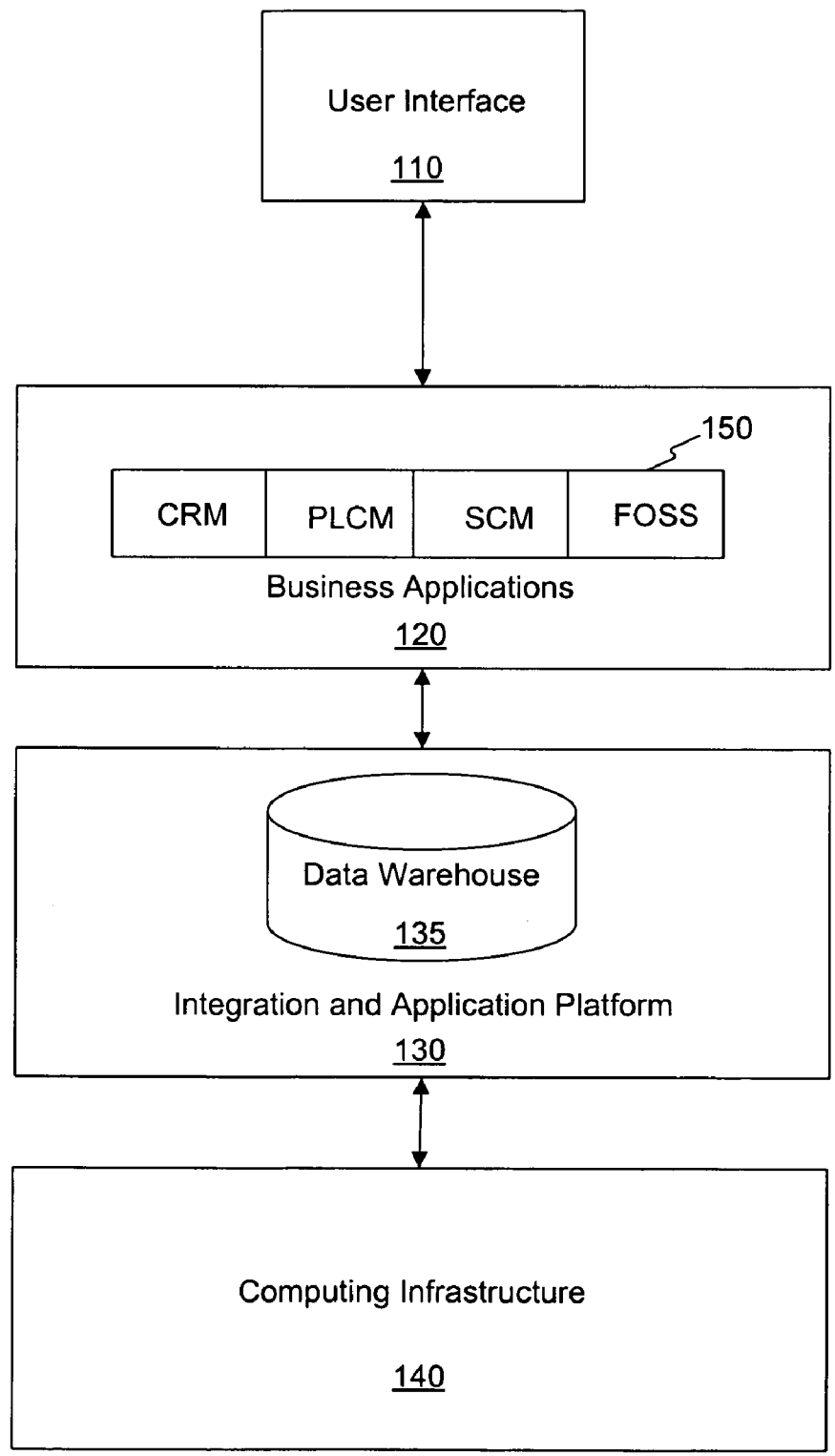
FIG. 1 illustrates a block diagram of an exemplary system architecture, consistent with an embodiment of the present invention.

FIG. 1 illustrates a block diagram of an exemplary system environment 100, consistent with certain aspects related to the present invention. As shown, system environment 100 may include computing infrastructure 140, integration and application platform 130, business applications 120, and user interface 110.

Computing infrastructure 140 may include one or more servers and storage devices. The servers and storage devices may be collocated with each other or may be distributed across multiple locations.

Integration and application platform 130 resides on computing infrastructure 140 and provides the foundation upon which business applications 120 are developed, integrated, and run. Examples of integration and application platform 130 include NetWeaver developed by SAP AG (Walldorf, Germany), .NET developed by Microsoft, and WebSphere developed by IBM.

A component of integration and application platform 130 is data warehouse 135. Data warehouse 135 enables an enterprise to exploit the large amount of data amassed (i.e., business intelligence (BI)) in day-to-day operations by providing a centralized source for collecting, interpreting, consolidating, and redistributing data that arrives from a variety of systems and business applications 120 within the enterprise. An example of a commercially available data warehouse is SAP NetWeaver BI developed by SAP AG.

Business applications 120 may comprise software packages that are dedicated to operational tasks of an enterprise. For example, business applications 120 may include software packages dedicated to such tasks as customer relationship management (CRM), product life cycle management (PLCM), supply chain management (SCM), and the like. Business applications 120 may also comprise FOSS 150.

User interface 110 may provide an interface to allow a user to interact with the business applications 120. For example, user interface 110 may be a software application, such as a browser. In some implementations, SAP Web Dynpro (commercially available from SAP AG) may be used as a model-based development environment for generating user interface 110, although other development environments may also be used.

Figure 2:
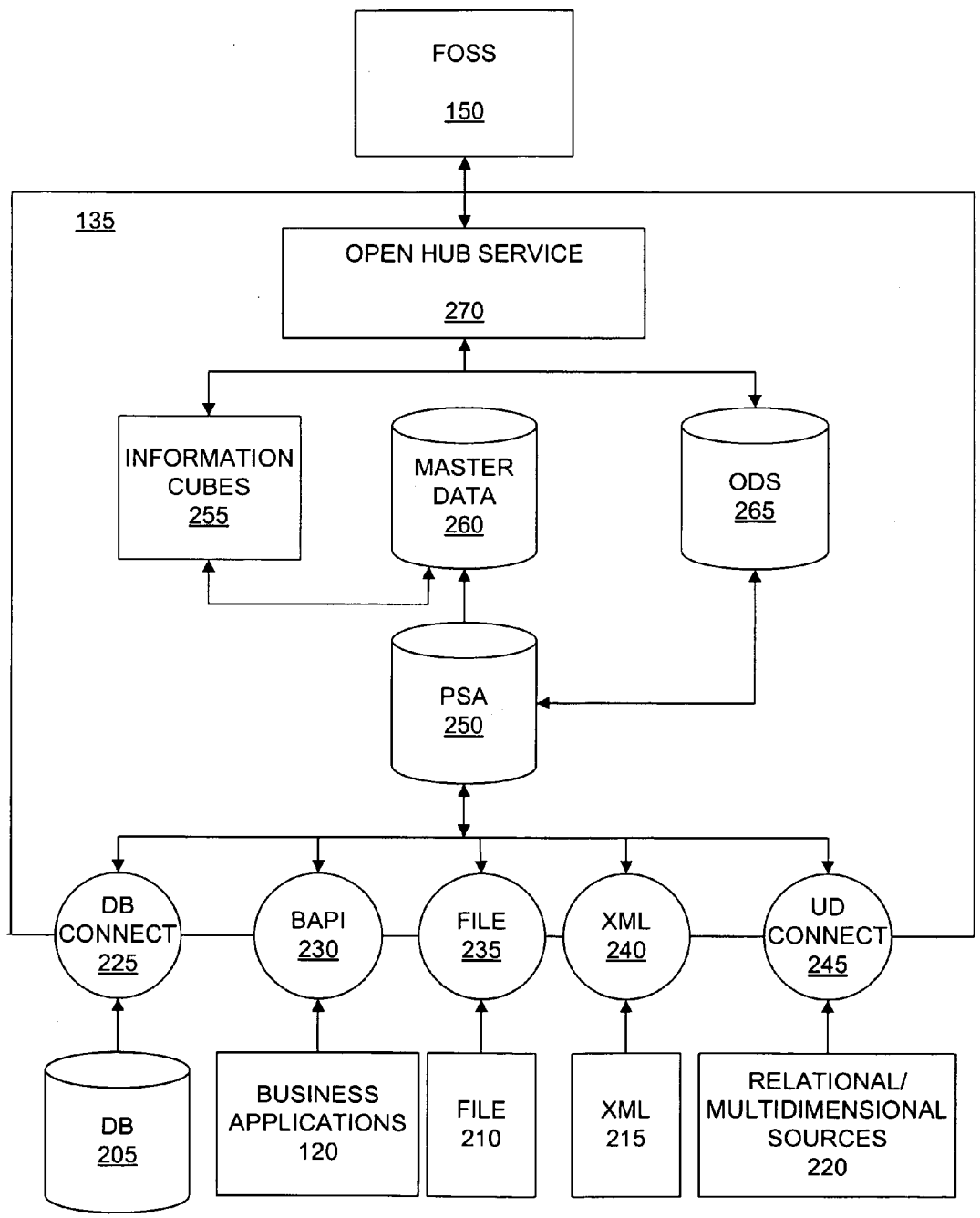
FIG. 2 illustrates a block diagram of an exemplary data warehouse, consistent with an embodiment of the present invention.

FIG. 2 illustrates a more detailed block diagram of the interaction of FOSS 150 and data warehouse 135. Data warehouse 135 may comprise a persistent staging engine (PSA)

250, information cubes 255, a master data store 260, an operational data store (ODS) 265, and an open hub service 270. Data warehouse 135 may also compromise various interfaces referred to as extraction, transformation, and loading (ETL) tools for accepting data. The ETL tools may include a database (DB) connect 225, a business application programming interface (BAPI) 230, a file interface 235, an extensible markup language (XML) interface 240, and a universal data (UD) connect 245.

In accordance with one embodiment, data warehouse 135 may include the capability to handle different data sources dependent on the ETL tools provided with data warehouse 135. For example, data warehouse 135 may have the capability to incorporate data from different databases 205, business applications 120, files 210, XML documents 215, and relational and multidimensional sources 220. It should be noted that although certain data sources are illustrated in FIG. 2, the invention is not limited to only these types of data sources and may incorporate more or less data sources.

The ETL tools of data warehouse 135 allows data of varying formats and from different departments within an enterprise to be copied into data warehouse 135 and organized into one standard format. For example, DB connect tool 225 may allow data warehouse 135 to connect to databases, such as Oracle and SQL servers at the database level for efficient data extraction. It may also expose the table structures of the database and allow a user to select fields for extraction. BAPI tool 230 is an open interface that may support the exchange of data and meta-data with business applications 120. File tool 235 may allow the extraction of CSV or ASCII files from any location defined within the enterprise and schedule, cleanse, transform, and load the data to the data warehouse 135. XML tool 245 may allow the extraction of XML files into data warehouse 135. UD connect tool 240 may access any data source which has an open interface via On Line Analytical Processing (OLAP) or Java Database Connectivity (JDBC) by exposing the data tables available to allow the user to select the fields for each extraction.

Data extracted by the ETL tools are first stored unchanged in PSA 250. PSA 250 may minimize the impact on busy operational systems during migration of data to the data warehouse 135, and provide short-term storage of the data in a format unchanged from its data source. From PSA 250, the data is subsequently transformed and loaded into one or more relational databases, such as ODS 265 and master data store 260. For example, ODS 265 is a relational database for current detailed transactional data. The data within ODS 265 is stored within ODS objects, which contain key fields (e.g., document number/item) and data fields that can also contain character fields (e.g., order status, customer) as key figures. Master data store 260 is a database for storing data that describes characteristics of information in an enterprise, such as cost collectors, customers, or vendors. The relational databases may be further used to build multidimensional models, which are referred to herein as information cubes 255. Information cubes 255 construct an extended star schema whose dimensions contain links to master data and other detail records in data warehouse 135.

Open hub service 270 provides tools for defining, scheduling, and managing the extraction of data from data warehouse 135 to applications and systems, such as FOSS 150. FOSS 150 leverages the capabilities of the data warehouse 135 in order to provide a controller with all necessary data required to detect emerging variances. With the open hub service 270, FOSS 150 may retrieve data and corresponding meta-data from information cubes 255 and ODS 265.

FOSS 150 is capable of understanding the analytical model of operational drivers and their impact on revenue. As used herein, the term "operational drivers" refers to the data variables that have an impact on an enterprises financial results. For example, FOSS 150 is capable of utilizing an operational driver, such as a trend in order cancellations, to project a potential loss of revenue as compared with the plan revenue within a specified timeframe (e.g., a financial period). FOSS 150 may accomplish this by creating and utilizing alert models that monitor operational drivers.

An alert model defines the relationships between the data objects stored within data warehouse 135. The flexible parameters within this defined relationship constitute the alert definition. That is, an alert definition is the parameterized and personalized alert model to be executed. The alert models may generate a trend that may be calculated based on historical behavior of the operational drivers and other data elements in order to project the behavior of the operational drivers, as well as the financial result on the enterprise. Information regarding the historical behavior of operational drivers and other data elements may be mined from data warehouse 135. For example, in the instance of an operational driver being current sales transactions, FOSS 150 may mine data warehouse 135 to determine past sales transactions from a prior period. Other operational drivers, such as orders pending, pre-orders, and the like may also be mined from data warehouse 135 and used to calculate the trend for sales transactions.

Figure 3A:
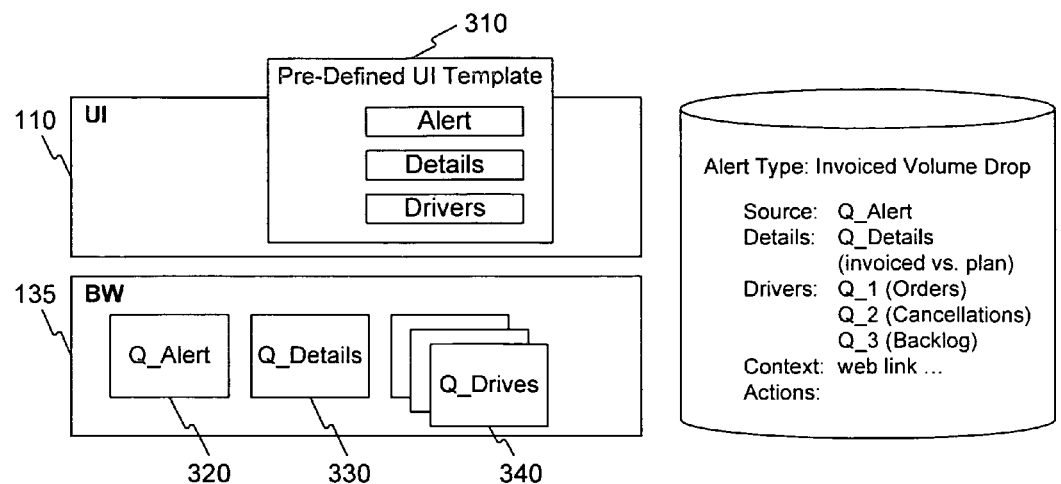
FIGS. 3A-3D illustrate exemplary operations of alert modeling and related processes, consistent with embodiments of the present invention.

Exemplary embodiments of the alert model creation, alert configuration, alert detection, and alert investigation processes are illustrated in FIGS. 3A-3D. As illustrated in FIG. 3A, FOSS 150 may provide alert models 310 that may be used as templates and adjusted based on the end-users needs. The alert models 310 may be stored and represented within the data warehouse 135 as queries 320-340, which may be parameterized. For example, the queries that comprise alert model 310 may include query alert (Q_Alert) 320, query details (Q-Details) 330, and query operational drivers (Q_Drivers) 340.

Figure 4:
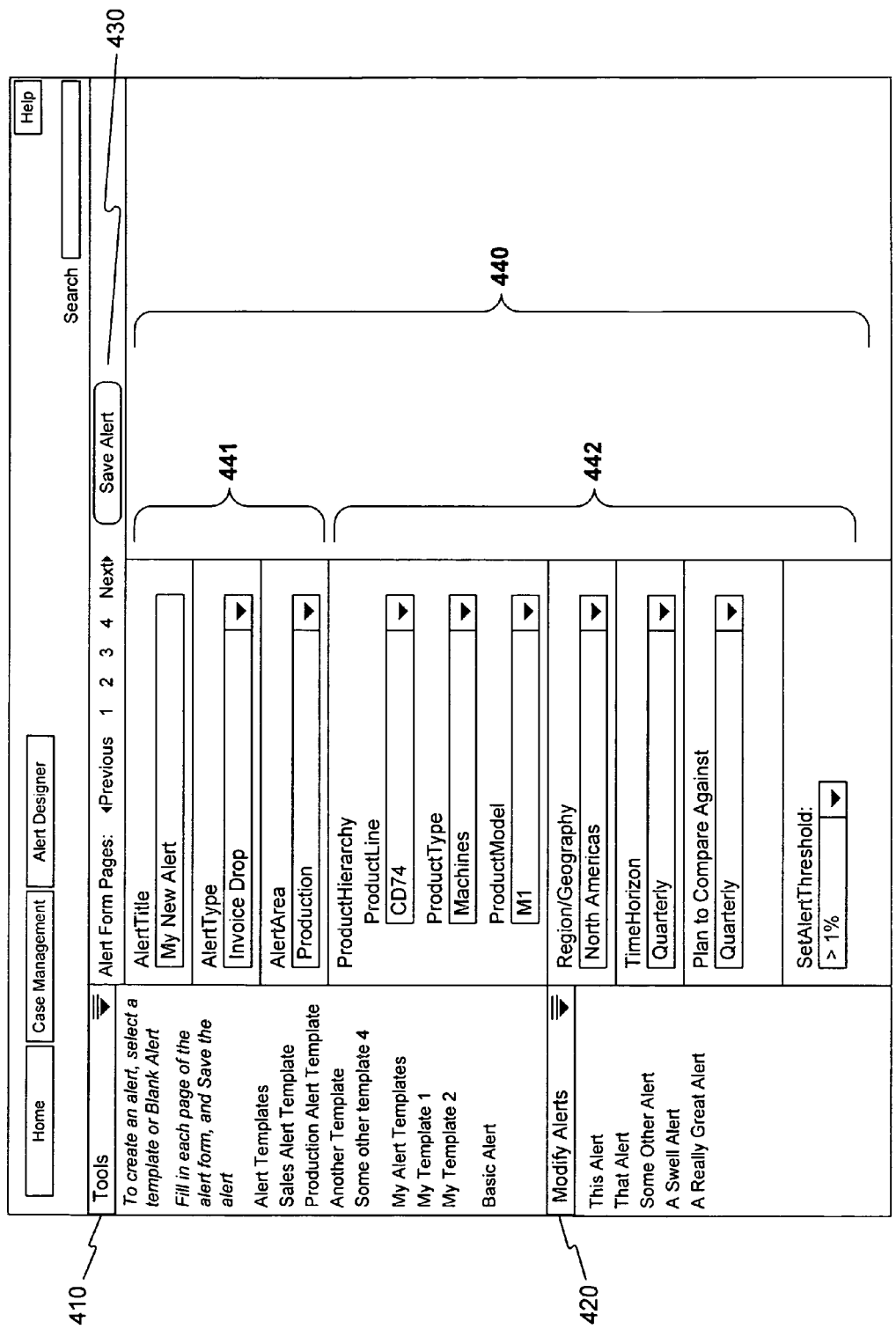
FIG. 4 illustrates a screenshot of an exemplary software application used to create an alert model and alert model definition, consistent with an embodiment of the present invention.

FIG. 4 is an exemplary screenshot of a page used to create and define alert model 310. The page may be divided into three sections: a tools section 410, a modify alerts section 420, and a workspace section 430. The tools section 410 list previously created alert models that are stored in data warehouse 135 and may be selected by a user for modification or parameterization. The modify alerts section 420 lists alert definitions, that is alert models that have been parameterized and stored in data warehouse 135. A user may create, modify, or parameterize an alert model in workspace section 430 through the use of drop-down menus 440. Drop-down menus 441 are used to create or modify the alert model 310, while drop-down menus 442 are used to create an alert definition (i.e., a parameterized and personalized alert model 310). As illustrated in this exemplary embodiment and drop-down menus 441, an alert model 310 for "Invoice Drop" is created. The trend of Invoice Drop projected towards the end of the period may be extrapolated to produce a projected revenue, which when compared to the plan revenue would indicate some deviation. Using only drop-down menus 441, this alert model 310 may look the same for a product manager in the U.S. and a worldwide business unit manager. However, alert model 310 may be parameterized and personalized by the means of the variables listed in drop-down menus 442.

In another embodiment, alert models 310 may be created and defined using a graphical tool, such as Visual Composer developed by SAP AG. The graphic tool may be implemented as a design tool that facilitates the creation of business packages using a visual user interface rather than manually writing code. The graphic tool may have access to the data stored with data warehouse 135 and presents that data along with different functionalities to a user in a graphical format. By selecting different data and functions and placing them together in a visual composer workspace a user is able to create an alert model 310.

Returning to FIGS. 3A-3D, an exemplary alert model 310 has been parameterized for the purpose of monitoring the volume drop of particular invoice within the enterprise. In particular, FIG. 3A illustrates that this alert model is entitled "Invoiced Volume Drop." The query alert parameter 320 (source) represents the actual alert configuration that is used to trigger the alert. The parameterization of the query alert parameter 320 is discussed in detail with respect to FIG. 3B. The query details parameter 330 (details) represents the operational driver that will be analyzed and compared for deviation. In this example, query details parameter 330 has been parameterized to specify that this alert model will be analyzing and comparing projected invoiced data versus plan data. For example, the projected invoiced data may be calculated by extrapolating actual invoiced data and historical performances of invoiced data (e.g., the level of invoiced data at this point last year) to generate a trend of where the actual invoiced data may be at a specified instance in future time.

The query operational drivers 340 (drivers) represent the operational drivers that may have an affect on the operational driver of invoiced data, and thus, will also be monitored by this alert model. In this example, query operational drivers 340 have been parameterized to include orders that have been placed and filled (orders), orders that have been cancelled (cancellations), and orders that are backlogged (backlog). That is, the queries 320-340 contain the flexible parameters that allow a user to parameterize and personalize alert model 310, and in effect, convert alert model 310 into an alert definition.

The data field "Context" defines the information that is pulled together after an alert is triggered. This information may be partly predefined within FOSS 150 and extendable by a user. For example, predefined information may include drill-down information regarding the deviation that occurred between the projected data and the plan data. A user could further add specific documents, for example, a financial outlook report to the context. The data field "Actions" defines what a user might need to do when acting on an alert. For example, this information may include the enterprise's best practices and procedures to be followed, such as informing key stakeholders, following preset approval flows, etc.

Figure 3B:
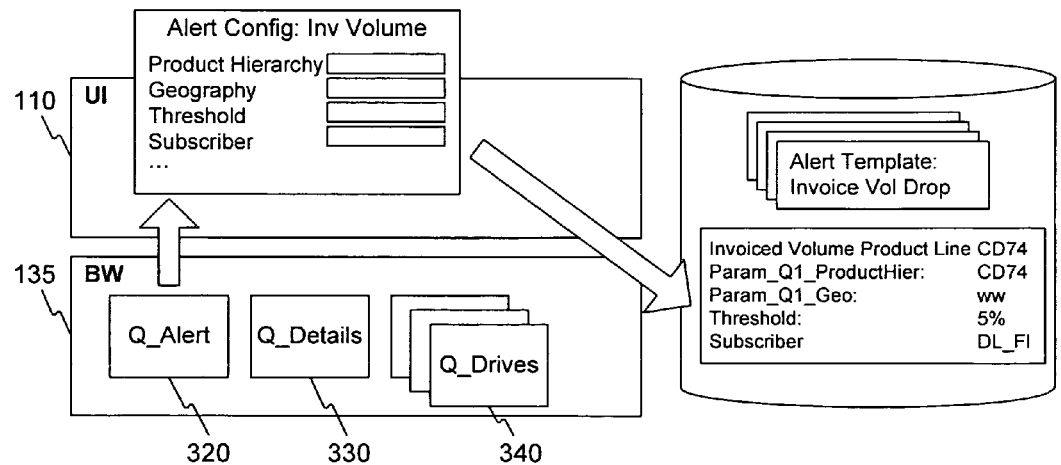

FIG. 3B illustrates an exemplary process of parameterizing the actual alert for an alert model 310. For example, the same parameterized alert model 310 (e.g., "Invoiced Volume Drop" illustrated in FIG. 3A) may apply to different users, but with different variable parameters for the actual alert configuration, such as geography, product hierarchy, thresholds, and the like. For example, a product manager in the U.S. may be merely interested in the situations that affect his or her product in the U.S., whereas a business unit manager may want to see the trends and projected deviation worldwide for all products within his or her organization. Therefore, each user may change the alert parameterization to suit his or her needs. Thus, one user may be interested in the product line for the product CD74 as opposed to product CD75. Also, a manager in the U.S. may only be interested in production of CD74 in the U.S. as opposed to the production of CD74 worldwide (ww). Further, the threshold deviation value allowed between the projected data and the plan data before the alarm is triggered may be set at varying percentage rates, units, dollar amounts, or the like. Finally, those who will receive a particular alert are designated in the subscriber field. For example, the subscriber may be designated as an e-mail distribution list, such as an entire financial department of an enterprise (DL_FI).

Figure 3C:
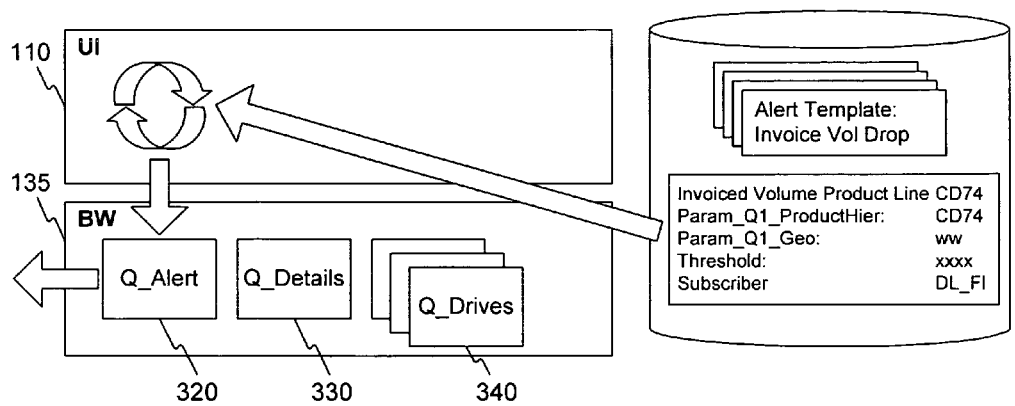
Figure 3D:
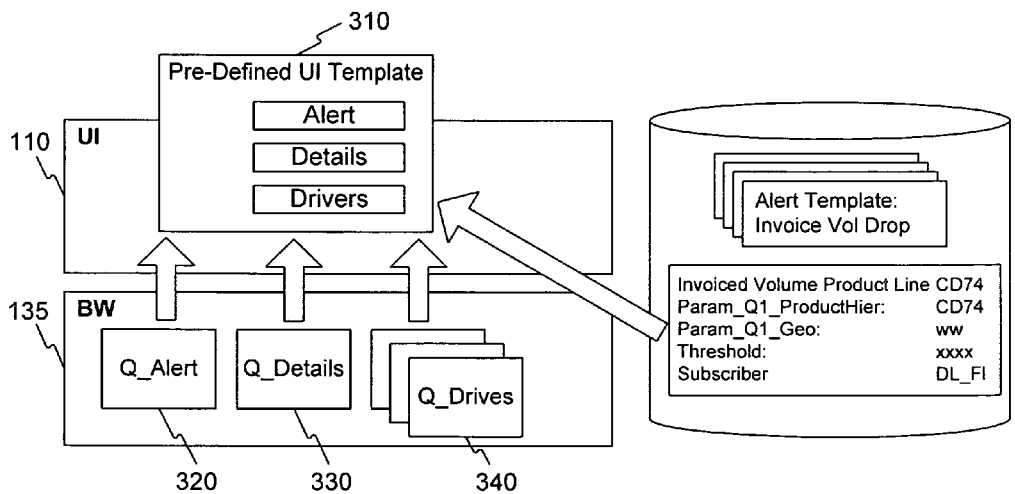

FIG. 3C illustrates an example of the alert detection process. As illustrated, the deviation of the volume of product line CD74 from the plan data has exceeded its threshold and an alert has been triggered. Alerts may be synchronized with the alert framework of the integration and application platform 130. For example, the integration and application platform NetWeaver includes the NetWeaver Alert Framework. The alert framework allows users of the integration and application platform 130 to be notified of errors in processing via e-mails, facsimiles, or short message services (i.e., text messaging). FOSS 150 may utilize its API with the integration and application platform 130 to access and confirm alerts. It should be noted that FOSS 150 may also utilize other alert frameworks, such as the Alert Framework of WebSphere and Notification Services developed by Microsoft.

Figure 5:
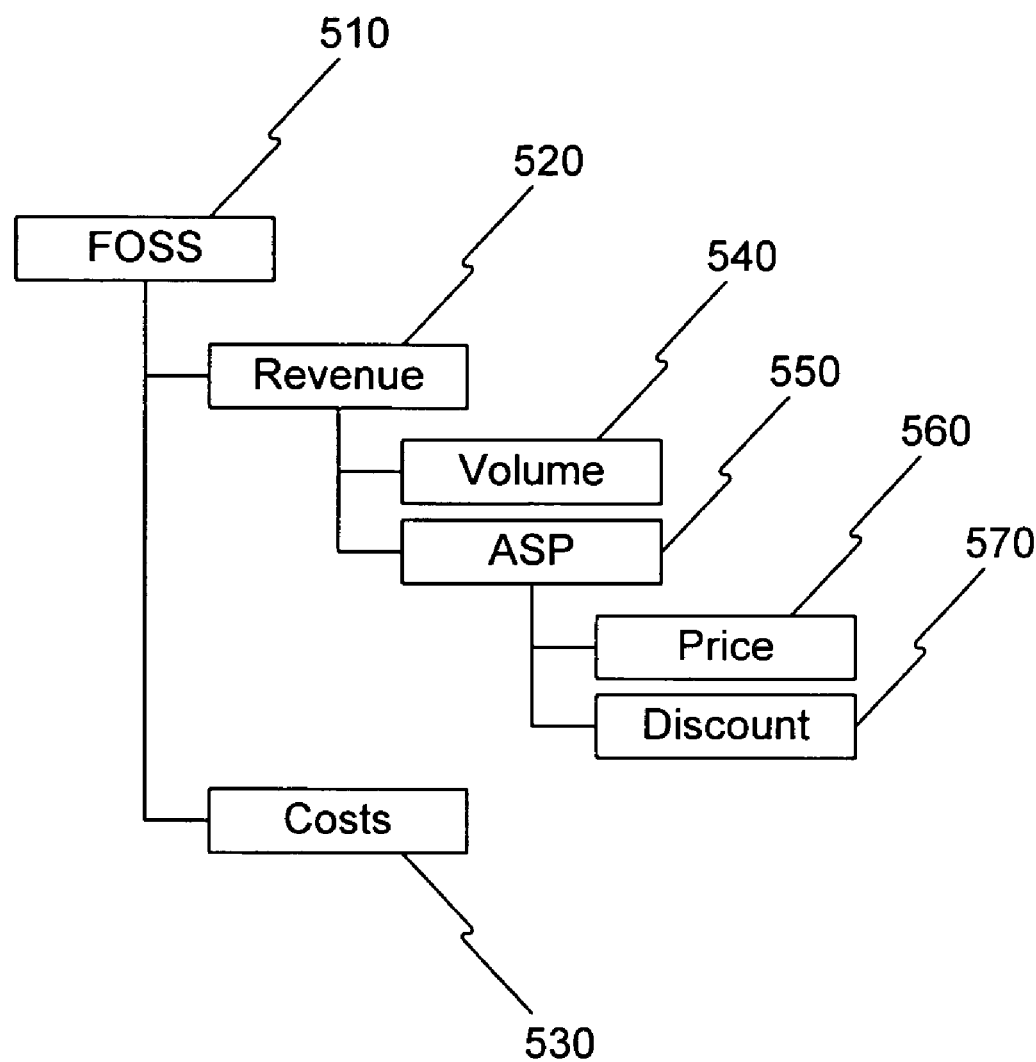
FIG. 5 illustrates an exemplary hierarchical chart of alert models, consistent with an embodiment of the present invention.

The alerts may be organized into specific alert categories to differentiate one alert from another. For example, alert categories may follow a hierarchical approach. FIG. 5 illustrates an example of such an approach. The alerts within the alert framework of the integration and application platform that pertain to FOSS 150 may be organized within FOSS category 510. The FOSS category 510 may include subcategories that contain alerts relating to revenue 520 and costs 530. The revenue subcategory 520 may further include other subcategories, such as volume 540 and average selling price (ASP) 550. Moreover, the ASP subcategory 550 may include subcategories for alerts relating to price 560 and discounts 570. The above example of alert categorization is not meant to be exhaustive. The organization may include more or less categories and subcategories.

Returning to FIG. 3D, an exemplary process of alert investigation is illustrated. As discussed above, alert investigation is one of the most time consuming tasks for controllers after an alert is detected. FOSS 150 allows data elements used within the models for alert detection querying to be presented to the end-user. Thus, these alert models 310 (BW queries) may be used by the user interface 110 to present the right information to the user. Information returned to the user may include the data used to create the alert model 310 and the alert definition. The information may also include the operational drivers that contributed to the alert. In one embodiment, the contributory operational drivers returned to the user are those predefined by a user as likely to contribute to a particular alert type. In another embodiment, the controlling operational drivers returned to the user are determined by a specified rule system, which is based on a causal chain of operational drivers that can drive an alert.

Another function of FOSS 150 is alert resolution, which acts upon alerts and allows the end-user to collaborate with others. Collaboration may range from sending e-mails to colleagues to the creation of virtual work rooms. The storage of an alert and the steps to resolve the alert is referred to as a "case" herein. A case may be created after a user views an alert. Further, the case may be visited for re-use and/or used as an audit trail to determine what actions were taken on the alert.

Figure 6:
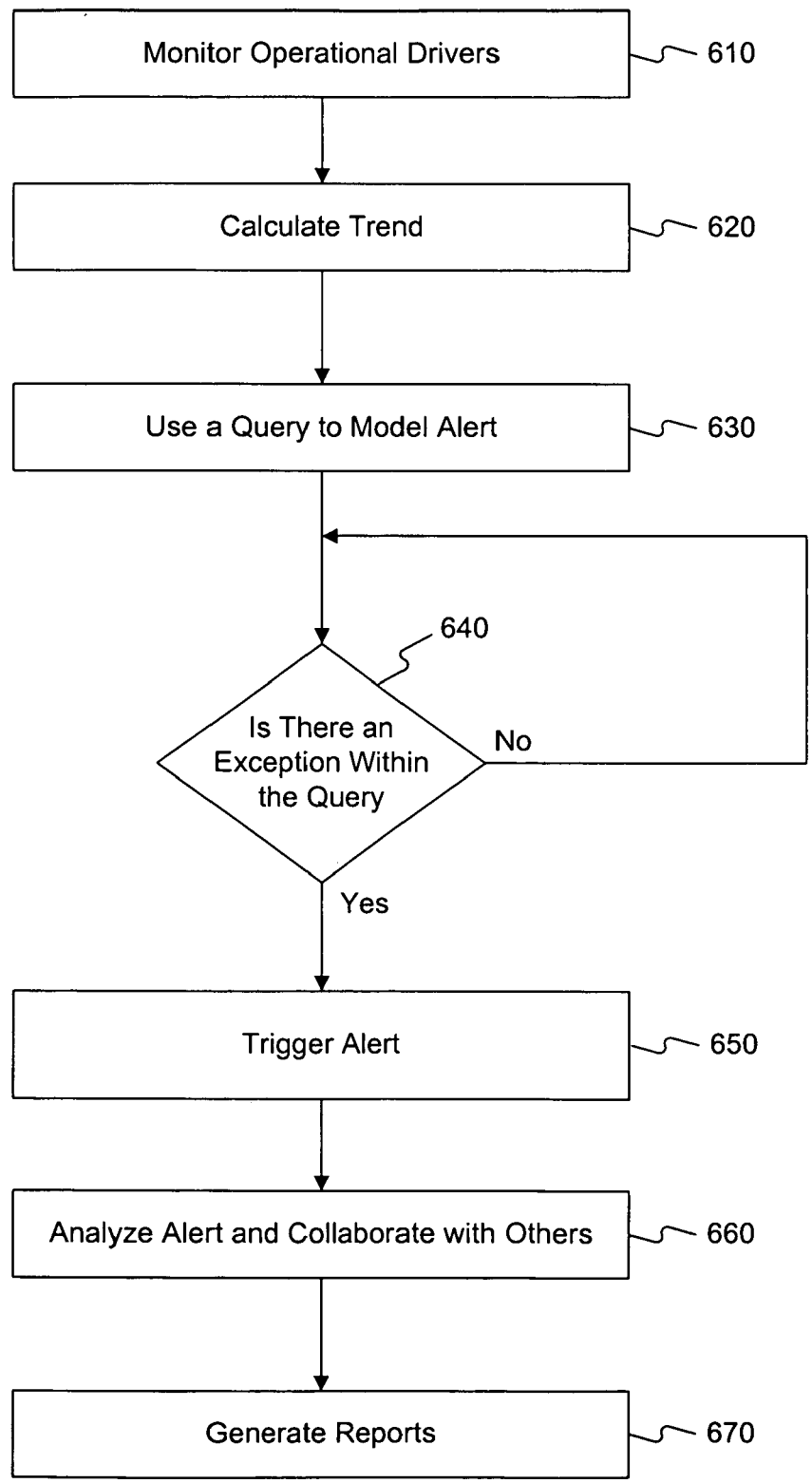
FIG. 6 illustrates a flowchart of an exemplary operation of alert detection, consistent with an embodiment of the present invention.

FIG. 6 illustrates a flowchart of an exemplary process associated with alert detection that may be performed by FOSS 150. During the alert detection process, operational drivers of an enterprise are monitored based upon the alert model 310 created (see, e.g., FIG. 3A) by FOSS 150 (Step 610). For example, if an alert model 310 was created to monitor the operational driver of invoice levels, other operational drivers to be monitored, because through a causal chain they may have an affect on invoice levels, may include orders that have been placed and filled (orders), orders that have been cancelled (cancellations), and orders that are backlogged (backlog) (see, e.g., FIG. 3A). Although data warehouse 135 initially consolidates and organizes the data pertaining to the operational drivers for evaluation purposes, further organization of the data may be provided to enable the display of meaningful connectivity between data that is too well hidden or complex to be discovered by the initial organization. Through the use of a various data transformations, such as statistical and mathematical calculations, and data cleansing or structuring processes, FOSS 150 makes it possible to find and identify these hidden or complex relationships between operational drivers.

Subsequently, a projected trend will be calculated based on the history and other data elements of the operational drivers in order to determine the behavior of the operational driver at a specified time, such as the end of a financial period (Step 620). The projected trend of the operational drivers may be further used to calculate the projected financial results (e.g., loss of revenue) of the enterprise or business unit within the enterprise. The projected trends may be calculated by utilizing the algorithms and functionality of a data mining software, such as Analysis Process Designer (APD) developed by SAP AG or Analysis Services developed by Microsoft. Queries may be used to model an alert based on information cubes 255 and ODS objects 265, within which the trending results may be stored (Step 630). These queries may be parameterized to include specific data pertaining to the behavior of the operational driver. The monitoring of the behavior of the operational driver is continued using the entered parameters to determine whether the behavior of the operational driver has caused an exception, such as a deviation based upon a preset percentage from the plan data within the query (Step 640). If an exception to the query has not occurred, the monitoring of the behavior of the operational driver is continued. However if a determination is made that an exception within the query has occurred, an alert generated by FOSS 150 is triggered (Step 650).

A triggered alert may be selected, opened, and analyzed by a user to determine the one or more causes that may have contributed to the triggering of the alert (Step 660.) Opening of an alert will generate a case. A case as illustrated, for example, in FIGS. 7 and 8, may include data used to create the alert model 310, the alert, and the operational drivers that contributed to the alert. During the analysis of the alert, the user may use drill-down or slice and dice functionality. As used herein, the terms "drill-down" and "slice and dice" refer to moving within a hierarchical structure of data from a broader level to a more detailed level. For example, if an alert occurs in a particular business unit of the enterprise, the user may want to see the performance of individual product lines within that business unit. FOSS 150 enables drill-down by providing the correct subset of data (i.e., data that will be drilled-down based upon the triggered alert). The subset of data that is provided may be predefined by a user per the alert type.

FOSS 150 is further capable of allowing a user to collaborate with others regarding the analyzing and resolution of the triggered alert (Step 670). The collaboration functionality provided by FOSS 150 may include sending e-mails to colleagues in the operational areas, to the creation of virtual work rooms that allows the sharing of project-related tools, services, and information from a single point of access. FOSS 150 may utilize the collaboration functionality of other applications to create virtual work rooms, such as the "collaboration room" functionality of NetWeaver or Microsoft Exchange. Moreover, FOSS 150 may allow reports to be generated for the triggered alerts and cases (Step 680). The reports may include the consolidation of the collaborative actions, resolutions agreed upon, annotations, and the like.

Finally, both analysis (including reporting) and issue management (including its collaboration needs) require a way for the controller to manage the data pieces they are working with. The underlying assumption is that analytic end users do not only work with their original data, but rather use the original data as a starting point to do several passes over the data, exploring different hypotheses, narrowing their focus, and testing out different foci, as they go along. This usually creates a bulk of interim results. FOSS 150 supports this activity by viewing it as an essential part of analytics, and integrating its support fully into the analytics user experience as illustrated in, for example, FIGS. 7 and 8.

Figure 7:
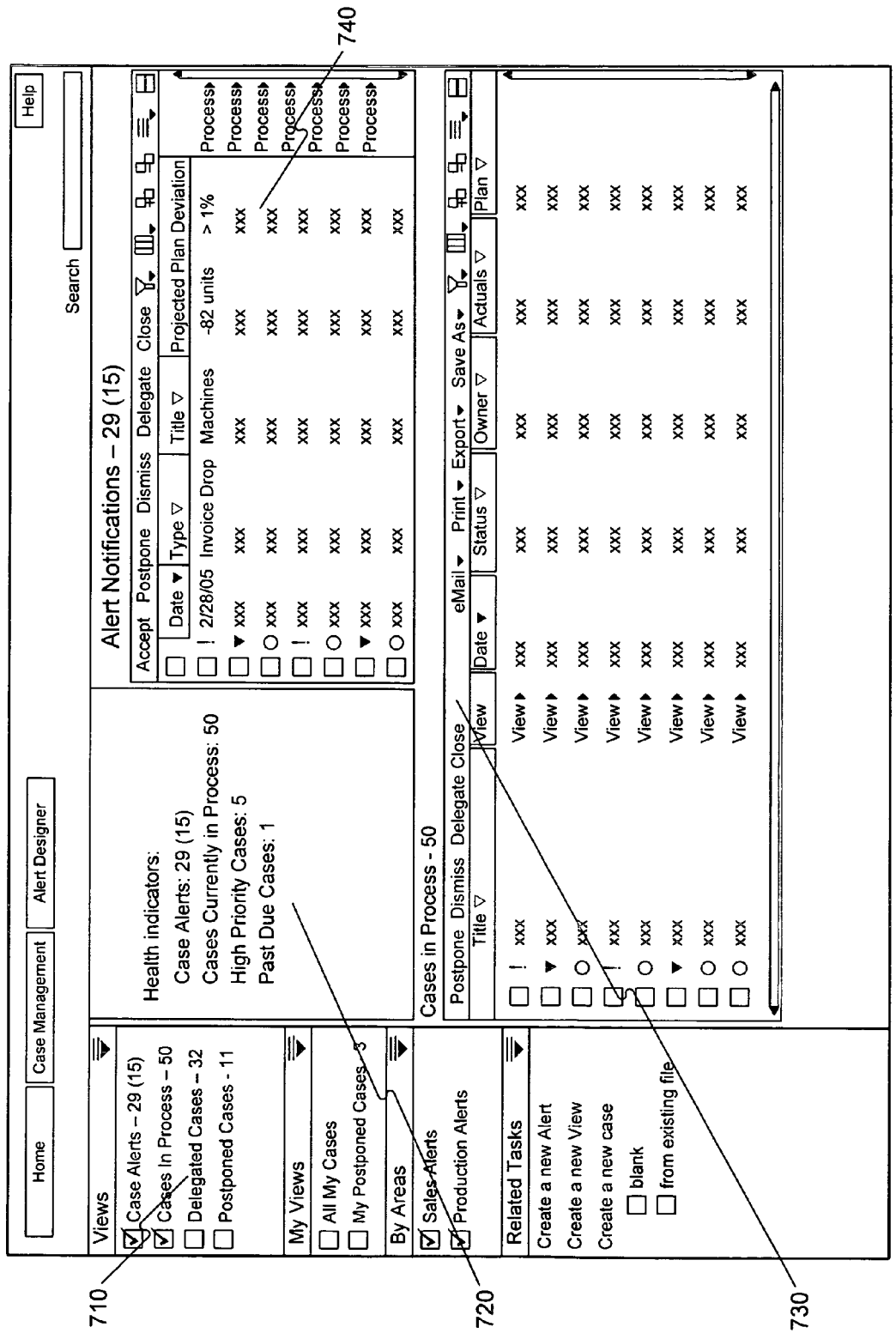
FIG. 7 illustrates a screenshot of an exemplary software application used to manage alerts, consistent with an embodiment of the present invention.

FIG. 7 illustrates an exemplary screenshot of a case management page within FOSS 150. As illustrated, the page may be divided into four sections: a view section 710, health indicator section 720, cases in process section 730, and alert notifications section 740. The view section 710 provides predefined customizable views of the case list. The view section 710 may also help with quick browsing and organizing of case data. The health indicator 720 summarizes vital information on the overall performance against plan data, and the overall state of the case/alert management. The case in progress section 730 allows a user to act on cases without having to open them. The alert ticker section 740 allows a user to see incoming alerts while processing cases.

Figure 8:
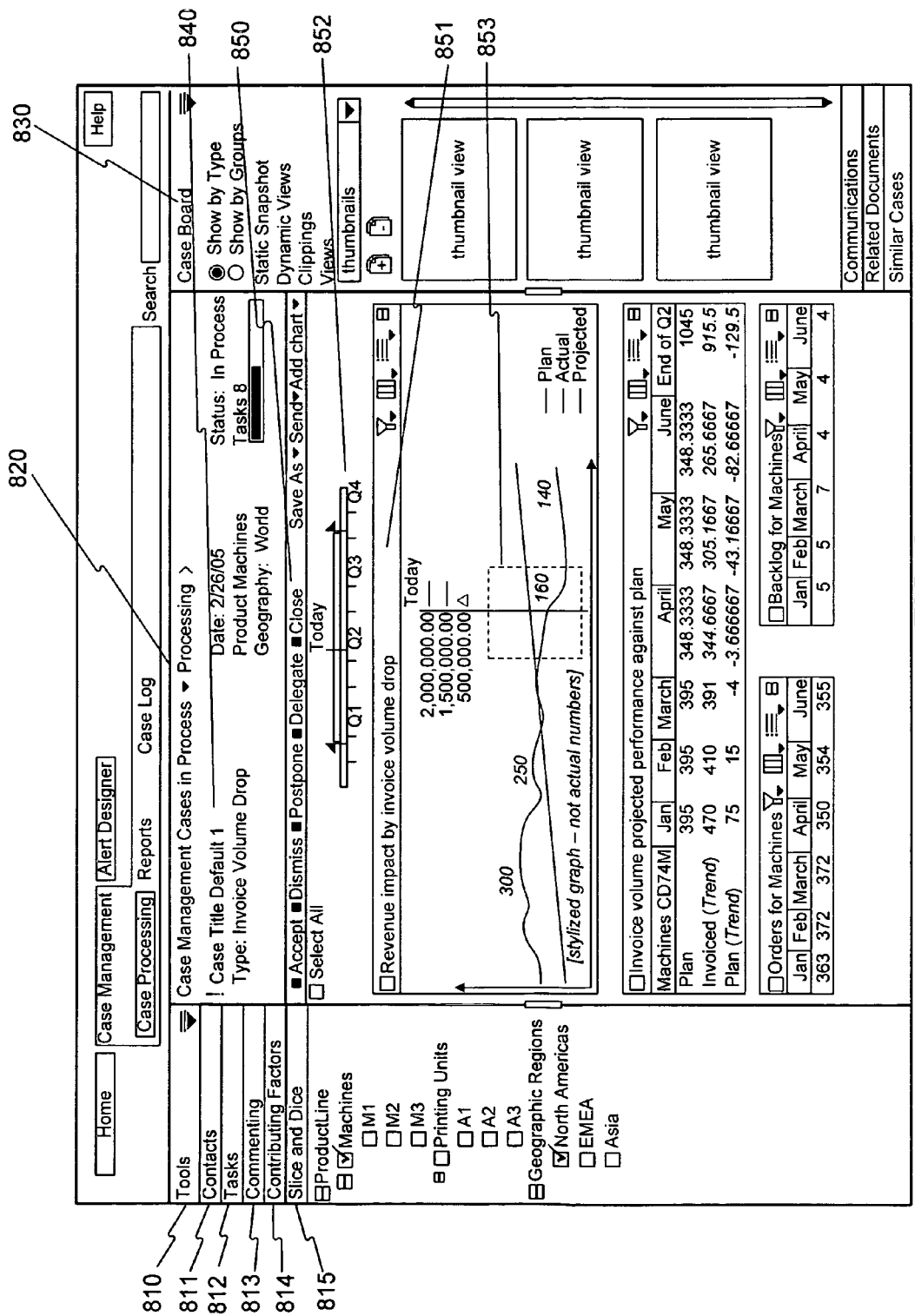
FIG. 8 illustrates a screenshot of an exemplary software application used to process alerts, consistent with an embodiment of the present invention.

FIG. 8 illustrates an exemplary screenshot of a case processing page, a sub-page of the case management page illustrated in FIG. 7. The case processing page may give a user access to case tools and data to collaboratively analyze, resolve, and document a case. The case processing page may be divided into three sections: a tools section 810, case management processing section 820, and case board section 830. The case management processing section 820 may further be divided into a case header section 840 and a center stage section 850.

The tools section 810 may give a user access to functionality, such as contacts 811, tasks 812, commenting 813, contributing factors 814, and slice and dice 815. As illustrated in FIG. 8, the current tool that is selected is the slice and dice tool 815. The slice and dice tool 815 may allow a user to gain more detailed information about a particular case. For example, if the case involved production, the slice and dice tool 815 may allow a user to select a particular machine or region of operation.

The case header section 820 contains case meta-data that may include status and task information. The center stage section 850 is an extension of the tools provided in tool section 810 as it provides a work space for the user to add and manipulate information in the form of graphs, tables, spreadsheets, and the like during the processing of case. For example, the center stage section 850 may include a case impact visualization 851, a time horizon slider 852, and a fisheye lens 853. The case impact visualization tool 851 may show the projected revenue impact of the issue at hand, as well as projected and plan data. The time horizon slider 852 allows a user to dynamically modify the time dimension and thereby adjust, for example, the historical data in the graph and tables displayed by the case impact visualization tool 851. The fisheye lens tool 853 allows users to view detailed data displayed by the case impact visualization tool 851 within a wider time horizon context. Case board 830 allows users to store content (e.g., individual graphs, tables, documents, snapshots, and the like) as part of their case for use in documenting or reporting the case. Information placed within case board 830 may also be used for reference during the drill-down/slice and dice process.

The contributing factors tool 814 may allow a user to search for and add more factors, such as tables, graphs, and data sources to their case center stage section 850. The tasks tool 812 may allow users to assign tasks to relevant contacts, and view a current task and its status. The task tool 812 may also provide an access point to the extended task management center stage. The contacts tool 811 may allow a user to store and access contact information for other others within the enterprise, such as department representatives. The reporting tool 813 may help a user to document their case by providing for the addition of text, as well as content from case board 830 that may be dragged and dropped into the report.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Further, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, one skilled in the art will appreciate that these aspects may also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules may be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules may be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for controlling operations of an enterprise, the method comprising:
    creating an alert model comprising:
        receiving a user selection of a data variable that affects the financial results of the enterprise;
        receiving a user selection of a parameter used for calculating a projected value of the data variable;
        receiving a user selection of a threshold of a deviation between the projected value and a planned value of the data variable;
        receiving a user selection of a subset of data related to the deviation between the projected value and the planned value;
    calculating, using a processor, the deviation between the projected value and the planned value;
    sending, using a processor, an alert message when the calculated deviation exceeds the threshold;
    generating and storing, using a processor, alert-related data after the user first responds to the alert message, the alert-related data comprising the selected data variable, the selected parameter, the alert message, and the user-selected subset of data;
    receiving, from the user, a request for the stored alert-related data;
    storing, using the processor, the steps to correct the deviation in the alert-related data; and
    generating a report summary regarding the alert message and the steps to correct the deviation.

2. The computer-implemented method of claim 1, wherein the alert model is stored as a query in a data warehouse.

3. The computer-implemented method of claim 1, wherein the deviation is based on the plan revenue of the enterprise.

4. The computer-implemented method of claim 1, wherein the threshold of the deviation is a measured deviation between projected data and plan data.

5. The computer-implemented method of claim 1, wherein the alert model comprises a projected trend of the behavior of the data variable.

6. The computer-implemented method of claim 5, wherein the projected trend comprises historical behavior of the data variable.

7. The computer-implemented method of claim 1, wherein sending the alert message comprises:
    creating a virtual work room that allows the sharing of project-related tools, services, and information from a single point of access.

8. A computer-readable storage medium including program instructions for performing, when executed by a processor, a method for controlling operations of an enterprise, comprising:
    creating an alert model comprising:
        receiving a user selection of a data variable that affects the financial results of the enterprise;
        receiving a user selection of a parameter used for calculating a projected value of the data variable;
        receiving a user selection of a threshold of a deviation between the projected value and a planned value of the data variable;
        receiving a user selection of a subset of data related to the deviation between the projected value and the planned value;
    calculating the deviation between the projected value and the planned value;
    sending an alert message when the calculated deviation exceeds the threshold;

generating and storing, using a processor, alert-related data after the user first responds to the alert message, the alert-related data comprising the selected data variable, the selected parameter, the alert message, and the user-selected subset of data;

receiving a request for the stored alert-related data;

storing, using the processor, the steps to correct the deviation in the alert-related data; and generating a report summary regarding the alert message and the steps to correct the deviation.

9. The computer-readable storage medium of claim 8, wherein the alert model is stored as a query in a data warehouse.

10. The computer-readable storage medium of claim 8, wherein the deviation is based on the plan revenue of the enterprise.

11. The computer-readable storage medium of claim 8, wherein the threshold of the deviation is a measured deviation between projected data and plan data.

12. The computer-readable storage medium of claim 8, wherein the alert model comprises a projected trend of the behavior of the data variable.

13. The computer-readable storage medium of claim 12, wherein the projected trend comprises historical behavior of the data variable.

14. The computer-readable storage medium of claim 8, wherein sending the alert message comprises:

creating a virtual work room that allows the sharing of project-related tools, services, and information from a single point of access.

* * * * *